(12) United States Patent
Doerk et al.

(10) Patent No.: US 11,160,370 B2
(45) Date of Patent: *Nov. 2, 2021

(54) HIGH-STRENGTH COLORED GLASS CERAMICS AS A COOKTOP, SMOOTH ON BOTH SIDES

(71) Applicant: SCHOTT AG, Mainz (DE)

(72) Inventors: Birgit Doerk, Mainz (DE); Evelin Weiss, Mainz (DE); Thomas Zenker, Nieder-Olm (DE); Ulf Hoffmann, Pfungstadt (DE); Silke Knoche, Saulheim (DE); Martin Taplan, Mainz (DE); Friedrich Siebers, Nierstein (DE); Thomas Kraus, Stadecken-Elsheim (DE); Lutz Klippe, Wiesbaden (DE); Wolfgang Schmidbauer, Mainz (DE)

(73) Assignee: SCHOTT AG, Mainz (DE)

( * ) Notice: Subject to any disclaimer, the term of this patent is extended or adjusted under 35 U.S.C. 154(b) by 343 days.

This patent is subject to a terminal disclaimer.

(21) Appl. No.: 16/042,469

(22) Filed: Jul. 23, 2018

(65) Prior Publication Data
US 2018/0325258 A1    Nov. 15, 2018

Related U.S. Application Data

(63) Continuation of application No. 13/489,992, filed on Jun. 6, 2012, now Pat. No. 10,028,580.

(30) Foreign Application Priority Data

Jun. 6, 2011 (DE) ...................... 10 2011 050 867.8

(51) Int. Cl.
*H05B 3/68* (2006.01)
*A47B 77/08* (2006.01)
(Continued)

(52) U.S. Cl.
CPC .......... *A47B 77/08* (2013.01); *C03C 10/0009* (2013.01); *C03C 17/002* (2013.01); *F24C 15/10* (2013.01)

(58) Field of Classification Search
CPC ...... H05B 3/74; H05B 6/1209; H05B 6/1218; H05B 2206/022; H05B 3/141; H05B 3/86;
(Continued)

(56) References Cited

U.S. PATENT DOCUMENTS 3,843,857 A   10/1974 Cunningham
4,290,061 A   9/1981 Serrano
(Continued)

FOREIGN PATENT DOCUMENTS

CN    101580593    11/2009
DE    4104983    3/1992
(Continued)

*Primary Examiner* — Sang Y Paik
(74) *Attorney, Agent, or Firm* — Ohlandt, Greeley, Ruggiero & Perle, L.L.P.

(57) ABSTRACT

A glass-ceramic cooktop is provided that is made of glass-ceramic material with a flat upper side and an underside. The glass-ceramic material has transmittance values of greater than 0.1% in the visible light range in the total wavelength region greater than 420 nm, a light transmittance in the visible range of 0.8-2.5%, and a transmittance of 0-85% in the infrared at 1600 nm, and wherein the glass-ceramic material has high quartz mixed crystals as the prevalent crystal phase. The underside is flat, unstructured, and coplanar with the upper side.

18 Claims, 1 Drawing Sheet

(51) Int. Cl.
*C03C 10/00* (2006.01)
*C03C 17/00* (2006.01)
*F24C 15/10* (2006.01)

(58) Field of Classification Search
CPC ............ C03C 2218/36; C03C 2204/08; C03C 10/0009; C03C 17/002; A47B 77/08; F24C 15/10
USPC .......................................... 219/443.1–468.2
See application file for complete search history.

(56) References Cited

U.S. PATENT DOCUMENTS

| | | | |
|---|---|---|---|
| 4,453,533 A | 6/1984 | Scheidler | |
| 6,144,019 A | 11/2000 | Garcia | |
| 6,342,762 B1 | 1/2002 | Young | |
| 6,914,223 B2 | 7/2005 | Krause | |
| 7,009,156 B2 * | 3/2006 | Maeuser | H05B 3/84 219/543 |
| 7,718,929 B2 | 5/2010 | Shimatani | |
| 10,028,580 B2 * | 7/2018 | Doerk | F24C 15/10 |
| 2005/0129959 A1 | 6/2005 | Roemer-Scheuermann | |
| 2007/0004578 A1 | 1/2007 | Monique Comte | |
| 2007/0295711 A1 | 12/2007 | Striegler | |
| 2008/0026927 A1 | 1/2008 | Monique Comte | |
| 2008/0035896 A1 | 2/2008 | Striegler | |
| 2008/0190409 A1 | 8/2008 | Demol | |
| 2008/0264931 A1 | 10/2008 | Vilato | |
| 2009/0155533 A1 | 6/2009 | Nuettgens | |
| 2012/0067865 A1 | 3/2012 | Siebers | |
| 2013/0201678 A1 | 8/2013 | Siebers | |

FOREIGN PATENT DOCUMENTS

| | | |
|---|---|---|
| DE | 19939787 | 2/2001 |
| DE | 102004059728 | 6/2006 |
| DE | 202006008304 | 8/2006 |
| DE | 102005046570 | 4/2007 |
| DE | 102004026836 | 5/2007 |
| DE | 102005052274 | 5/2007 |
| DE | 10355160 | 4/2008 |
| DE | 102006027739 | 5/2008 |
| DE | 102009013127 | 9/2010 |
| EP | 1465460 | 10/2004 |
| JP | H11100229 | 4/1999 |
| JP | H11100230 | 4/1999 |
| JP | 2002043047 | 2/2002 |
| JP | 2006125645 | 5/2006 |
| WO | 2010040443 | 4/2010 |
| WO | 2012010278 | 1/2012 |

* cited by examiner

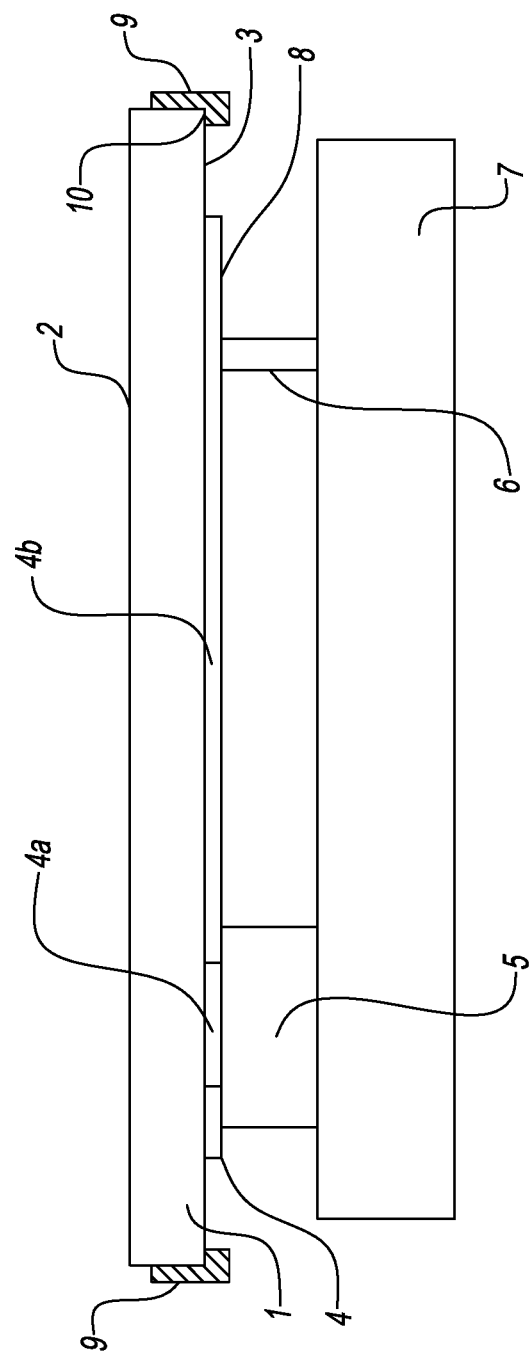

HIGH-STRENGTH COLORED GLASS CERAMICS AS A COOKTOP, SMOOTH ON BOTH SIDES

CROSS REFERENCE TO RELATED APPLICATIONS

This application is a continuation of U.S. patent application Ser. No. 13/489,992, filed on Jun. 6, 2012, which in turn claims the benefit under 35 U.S.C. § 119(a) of German Patent Application No. 10 2011 050 867.8, filed Jun. 6, 2011, wherein the entire contents of each are incorporated by reference in their entirety.

BACKGROUND OF THE INVENTION

1. Field of the Invention

The invention relates to a glass-ceramic cooktop having a flat upper side forming a cooktop and a smooth underside, wherein the glass-ceramic material of the cooktop has transmittance values of greater than 0.1% in the visible light range in the total wavelength region greater than 420 nm, a light transmittance in the visible range of 0.8-2.5%, and a transmittance of 0-85% in the infrared at 1600 nm, and wherein the glass-ceramic material has high quartz mixed crystals as the prevalent crystal phase.

2. Description of Related Art

Cooktops having a glass-ceramic plate as a cooking surface are familiar prior art. These glass-ceramic plates are usually present as flat plates or are shaped three-dimensionally.

Glass ceramics with high quartz mixed crystals as the prevalent crystal phase are produced from crystallizable lithium aluminum silicate glasses.

These glass ceramics are produced in several steps.

In the large-scale technical production of glass ceramics, first the crystallizable initial glass made up of a mixture of shards and powder-form batch raw materials is melted at temperatures usually between 1500 and 1650° C. Typically, arsenic and/or antimony oxide is used as a refining agent in the melt. These refining agents are compatible with the required glass-ceramic properties and lead to good bubble qualities of the melt. Although these substances are rigidly bound in the glass framework, they are a disadvantage from the points of view of safety and environmental protection. Thus, special precautionary measures must be taken in the recovery and treatment of raw materials and due to evaporation in the melt.

Recently, the particular use of $SnO_2$ as an unobjectionable refining agent has been described. In order to obtain good bubble qualities, at conventional melting temperatures (a maximum of approximately 1680° C.), in addition to $SnO_2$ preferably halide compounds are used as additional refining agents. Thus, the use of 0.1-2 wt. % $SnO_2$ and 0-1 wt. % Cl is described in the Japanese Patent Applications JP 11 100 229 A and JP 11 100 230 A. According to these publications, coloring by addition of $V_2O_5$ as the only colorant has been achieved.

The addition of 0.05-1 wt. % fluorine (US 2007 0004578 A1) and 0.01-1 wt. % bromine (US 2008 0026927 A1) for support of refining with $SnO_2$ is also disclosed. Refining temperatures below 1700° C. have also been described in these publications. The primary colorant is $V_2O_5$. The addition of halides is a disadvantage, since they vaporize greatly at the melting temperature and thus form toxic compounds, such as, e.g., HF.

The use of $SnO_2$ in combination with high-temperature refining above 1700° C. in order to obtain good bubble qualities is described in DE 199 39 787 C2. This publication, however, provides no indication for obtaining a good display capability in the wavelength range starting from 420 nm.

After melting and refining, the glass usually undergoes a hot shaping by rollers or more recently floats, in order to produce plates. For an economical production, on the one hand, a low melting temperature and a low processing temperature $V_A$ are desired; on the other hand, the glass should not show any devitrification during the shaping. That is, no disruptive crystals that would adversely affect the strength in the initial glasses and the glass ceramics produced therefrom should be formed. Since shaping takes place in the vicinity of the processing temperature $V_A$ (viscosity of $10^4$ dPas) of the glass, it must be assured that the upper devitrification temperature of the melt lies in the vicinity of and most favorably below the processing temperature, in order to avoid the formation of disruptive crystals.

Subsequently, the initial glass is converted into the glass-ceramic article by controlled crystallization. This ceramicizing takes place in a two-step temperature process, in which first nuclei are produced by nucleation at a temperature between 680 and 800° C., usually from $ZrO_2/TiO_2$ mixed crystals. $SnO_2$ can also participate in the nucleation. With subsequent increase in temperature, the high quartz mixed crystals grow on these nuclei. High rates of crystal growth, such as are desired for an economical, rapid ceramicizing, are obtained at temperatures of 850 to 950° C. For this maximum production temperature, the structure of the glass ceramics is homogenized, and the optical, physical and chemical properties of the glass ceramics are adjusted. If desired, the high quartz mixed crystals can subsequently still be converted into keatite mixed crystals. The transformation into keatite mixed crystals is produced in the case of an increase in temperature in a range from approximately 950 to 1200° C. With the transition from high quartz to keatite mixed crystals, the thermal expansion coefficient of the glass ceramics is increased and the transparency is reduced due to the light scatter that accompanies the enlargement of the crystals. As a rule, glass ceramics with keatite mixed crystals as the principal phase are thus translucent or opaque and the light scatter associated therewith acts negatively on the display capability.

A key property of these glass ceramics with high quartz mixed crystals as the principal crystal phase is the ability to produce materials that provide an extremely low thermal expansion coefficient of $<0.5 \times 10^{-6}/K$ in the range from room temperature up to 700° C. and above. Based on the low thermal expansion, these glass ceramics possess an excellent resistance to differences in temperature and stability relative to fluctuating temperatures.

In the application as a cooktop, the technical development based on requirements from practical use leads to very specific, partially contradictory requirements for transmittance.

In order to prevent a disruptive view onto the technical components below the glass-ceramic cooktop and in order to avoid the dazzling effect due to radiating heating elements, in particular bright halogen heating elements, glass-ceramic cooktops are limited in their light transmittance. For display capability, however, a certain light transmittance is necessary in order to assure sufficient brightness with the use of commercial components, e.g., signal generators, LEDs, etc.

In order to satisfy these requirements, glass-ceramic cooktops are usually adjusted to light transmittance values of 0.5 to 2.5%. This is achieved by additions of coloring elements. Glass-ceramic cooktops then appear to be black in a top view, due to the low light transmittance, no matter what the coloring element used, while in a transparent view, they appear for the most part red, red-violet or orange-brown according to the coloring elements used.

Color displays are composed of electronic components emitting light, for the most part light-emitting diodes, which are incorporated below the cooktop. They are particularly necessary in the case of induction cooktops for ease of operation and safe operation. For example, the actual heating power or residual heat of the different cooking zones is optically displayed. The display of the residual heat is important for safe handling when the heating elements are not turned on or, as in the case of inductively heated cooking surfaces in general, it cannot be ascertained that the cooktop is hot. The usual red light-emitting diodes irradiate at wavelengths of around 630 nm. In order to improve ease of operation and technical functions, but also to offer the possibility for household appliance manufacturers to differentiate their designs, in addition to the usual red display, displays of other colors are also desired.

Cooktops of Japanese origin are known, in which an LCD display is present, which can be backlit in green, orange and red.

The most varied colors that are used herewith, with the exception of the color red, at the present time serve exclusively for esthetic purposes. The color red, however, usually always indicates danger.

Safety information is only coded and known via display elements or symbols of the same color in seven-segment displays. In safety-critical situations, the user is forced to think of which display he wants to turn on. Added to this is the fact that there is a flood of information available to the user due to the high degree of technology in kitchens and the many appliances present in kitchens, such as cooking ovens, baking ovens, microwaves, grilling devices, hoods, refrigerating and freezing appliances, as well as bread slicing machines, etc., the information being different from one device to another. For example, a red blinking light in one appliance can indicate a danger, while in another device, it indicates an operation.

In commercial colored cooktops, the user cannot recognize the operating state and error condition by means of colors, thus whether the appliance is ready to operate or whether an indication of a possible error condition is present.

An earlier type of glass-ceramic cooktop, known under the name Ceran Color®, produced by SCHOTT AG, possessed good color display capability. Ceran Color® is colored by additions of NiO, CoO, $Fe_2O_3$ and MnO and refined by $Sb_2O_3$. A light transmittance of typically 1.2% is adjusted for cooktops with a usual thickness of 4 mm by this combination of color oxides. The transmittance in the range of 380 nm to 500 nm is 0.1-2.8%, depending on wavelength in each case. In the case of a wavelength of 630 nm that is common for red light-emitting diodes, the transmittance amounts to approximately 6%. It is a disadvantage in this earlier type of glass-ceramic cooktop that the color oxides used also absorb very strongly in the infrared. The IR transmittance at 1600 nm amounts to less than 20%. Thus, the rate of cooking is reduced. The transmittance curve of Ceran Color® is illustrated in the book "Low Thermal Expansion Glass Ceramics", Editor Hans Bach, Springer Publishing Co. Berlin Heidelberg 1995, on page 66 (ISBN 3-540-58598-2). The composition is listed in the book "Glass-Ceramic Technology", Wolfram Holand and George Beall, The American Ceramic Society 2002 in Tables 2-7.

In more recent, further developed glass-ceramic cooktops, for the most part $V_2O_5$ is used for coloring, since it has the special property of absorbing in the visual light range and permitting a high transmittance in the range of infrared radiation.

The coloring by $V_2O_5$ is represented as a very complex process. As was shown in earlier investigations (DE 19939787 C2), a redox process is a prerequisite for converting the vanadium oxide to the coloring state. In crystallizable initial glass, the $V_2O_5$ still colors relatively weakly and produces a light green color shade. In the ceramicizing, the redox process occurs, the vanadium is reduced and the redox partner is oxidized. The refining agent functions as the primary redox partner. This was shown by Mössbauer investigations of Sb and Sn-refined compositions. In the ceramicizing, a part of the $Sb^{3+}$ or $Sn^{2+}$ in the initial glass is converted to the higher oxidation state $Sb^{5+}$ or $Sn^{4+}$. It can be assumed that the vanadium is incorporated in the seed crystal in the reduced oxidation state as $V^{4+}$ or $V^{3+}$ and is intensively colored therein due to electron charge-transfer reactions. Also, as another redox partner, $TiO_2$ can reinforce the coloring by vanadium oxide. In addition to the type and quantity of the redox partners in the initial glass, the redox state that is adjusted in the glass for the melt also has an influence. A lower oxygen partial pressure $pO_2$ (melt adjusted as reducing), e.g., due to high melting temperatures, reinforces the coloring effect of the vanadium oxide.

The ceramicizing conditions have another influence on the coloring effect of the vanadium oxide. In particular, high ceramicizing temperatures and longer ceramicizing times lead to a more intense coloring.

The described relationships for coloring by means of $V_2O_5$ will be useful for the person skilled in the art, in order to establish the desired transmittance curve by means of a specific glass composition, specific redox adjustments of the $pO_2$ for the melt and the ceramicizing conditions. Previously, however, it was not possible to achieve all requirements, such as light transmittance and high IR transmittance in compliance with specifications, as well as display capability for standard red light-emitting diodes together with the desired improved display capability for light-emitting displays of other colors.

The form of the absorption bands of the vanadium oxide and thus transmittance in the visible light range in the entire wavelength region greater than 450 nm up to the upper limit of 750 nm could not be adapted to higher transmittances.

Examples of such types of $V_2O_5$-colored glass-ceramic cooktops are the $Sb_2O_3$-refined Ceran Hightrans® and the $SnO_2$-refined Ceran Suprema®, which are produced by the company SCHOTT AG. The transmittance curves of these two glass ceramics are published in the book "Low Thermal Expansion Glass Ceramics", Second Edition, Editor Hans Bach, Dieter Krause, Springer Publishing Co. Berlin Heidelberg 2005, on page 63 (ISBN 3-540-24111-6).

The transmittance value of 0.1% is not exceeded in the case of the named glass-ceramic cooktops and for other glass-ceramic cooktops found on the market in the wavelengths of approximately 450-550 nm that are important for the visibility of color displays, in particular blue and green displays. Other essential requirements for transmittance are fulfilled by these glass-ceramic cooktops: high infrared transmittance for high rates of cooking, transmittance in compliance with specifications for standard red light-emitting diodes at approximately 630 nm and a light transmittance of about 1.5%.

In order to eliminate this disadvantage, the European Patent Application EP 1465460 A2 discloses a glass-ceramic cooktop that has a Y value (brightness) of 2.5-15 for a thickness of 3 mm, measured in the CIE color system with standard light C. The designations "brightness" and light transmittance correspond to the same measurement value. The Y value is identical to the value of light transmittance, measured according to DIN 5033. Improved displays for blue and green light-emitting diodes will be obtained with this light transmittance. The disclosed compositions are refined with $As_2O_3$ and/or $Sb_2O_3$, partially in combination with $SnO_2$. The coloring is carried out by means of $V_2O_5$.

It is pointed out in the comparative example that the display capability for blue and green light-emitting diodes having the listed material compositions is insufficient for a light transmittance of 1.9%. The claimed high values of light transmittance of at least 2.5% and preferably higher, however, are disadvantageous with respect to hiding the electronic components underneath the cooktop. In addition, the esthetic black appearance of the cooktop from a top view is adversely affected.

A cooktop of glass-ceramic material is known from DE 10 2009 013 127 A1, which provides transmittance values of greater than 0.1% in the visible light range in the total wavelength region greater than 420 nm, a light transmittance in the visible range of 0.8-5%, (preferably 0.8-2.5%) and a transmittance of 45-85% in the infrared at 1600 nm. With such a cooktop, it is assured that the disruptive transparent view onto the technical components underneath the glass-ceramic cooktop is prevented and the esthetic black appearance in the view from the top remains assured. Radiant heating elements are visible during operation and common red light-emitting diode displays can be well recognized. Due to the transmittance of more than 0.1% in the visible light range in the total wavelength region greater than 450 nm, displays of other colors are also well recognizable. In view of the luminosity of commercial blue, green, yellow or orange light-emitting diodes, this transmittance value is sufficient and represents a clear improvement when compared with the prior art. In particular, displays having blue and green colors are clearly improved. Displays with white light are less falsified in color due to the transmittance curve in the entire wavelength region above 450 nm.

The glass-ceramic plates for the cooktops are shaped by upper and lower rollers via a special rolling process. The melted liquid initial glass is introduced into the rollers via a drawing nozzle. The rollers are composed of a special material in order to assure a controlled heat extraction between glass and rollers. Uncontrolled crystallization in the molds of the glass strip must be avoided during the hot shaping by the rollers. The glass strip is guided over a roller table into an annealing lehr. The glass strip is initially kept at temperatures higher than the transformation temperature and lower than the nucleation and crystallization temperatures of the initial glass, in order to reduce possible stresses. After cooling the glass strip to room temperature, the glass strip is cut, the edges are processed, it is decorated with ceramic colors and subsequently transformed into glass ceramics in the ceramicizing oven.

These glass-ceramic plates for cooktops possess a knob-like underside structure in order to fulfill the strength requirements for glass-ceramic plates for cooktops. These knobs are embossed in the underside of the glass strip via a knobby bottom roller during the hot shaping.

This knobby structure is composed of regular patterns of spherical caps or knobs that are round or oval or can also be of another shape. The knobs bring about a protection of the underside of the glass-ceramic plate against strength-reducing lesions.

The strength is lastly obtained in that the "lesions" of the underside are collected on the knob caps, so that in "valleys", where the maximum dangerous tensile stresses occur under load, the notching effect is reduced, since the glass-ceramic surface has not been damaged.

The disadvantage of these knobs is the scattering of the light that is conducted through the glass-ceramic plate. It is not possible to make visible without distortion the displays or structures underneath the glass-ceramic plate. Displays and also the cooking zones are thus perceived in a slightly distorted manner.

The local introduction of a silicone layer in order to make visible without distortion the usual light-emitting displays is known from DE 41 04 983 C1. This silicone layer, however, introduces an additional expense, has poor transmittance behavior, and is less temperature-stable at the high heating temperatures of the cooktop. For this reason, this immersion layer can just be used locally in cold regions of the cooktop. The distorted view of the heating zones still exists.

BRIEF SUMMARY OF THE INVENTION

The object of the invention is to create a glass-ceramic cooktop of the type described initially, which is characterized by improved application properties, for example, good display qualities of the display devices, and/or the functionality of heating elements and/or sensor units.

This object is achieved by the fact that the underside is shaped flat, unstructured and coplanar with the upper side.

Accordingly, it is proposed according to the invention that the underside of the cooktop, like the upper side of the cooktop, is not structured and is shaped flat. Therefore, it does not have the familiar knobs known from the prior art, but is as smooth as the surface. Good display properties can be provided by this coplanar arrangement of the upper side and the underside. In particular, in combination with the glass-ceramic material used, distortion-free color (e.g., blue) displays, which were not previously possible, having a clearly improved display sharpness can be provided.

According to a preferred variant of the invention, it can be provided that at least one coating and/or foil 4 is introduced onto the underside 3. Due to the fact that the underside 3 is shaped flat and smooth, coatings with a uniform thickness can also be provided, which then also simultaneously have uniform properties. The coating and/or foil 4 in this case can be part of a display. In particular, the coating 4 can form a masking having light-transparent 4a and non-transparent 4b regions. This masking is then disposed between the cooktop 1 and a light-emitting element 5, whereby the light-emitting element 5 transmits its light through the transparent regions 4a into the cooktop 1 and thus the light can then be decoupled on the upper side 2 of the cooktop 1, and in fact, without distortion, a sharp contour display corresponding to the masking being provided.

The coating and/or foil forms a masking with light-transparent and non-transparent regions and a light-emitting element, e.g., a 7-segment display or a display unit, is disposed at a distance in the region under the coated underside.

It has been shown that with the smooth configuration of the cooktop on both sides according to the invention, in combination with the glass-ceramic material used, cooktop thicknesses in the range between 2 mm and 6 mm, preferably in the range between 3 and 5 mm, can be provided. In this way, a sufficient mechanical stability results for cooktop applications.

It has been shown that the thickness of the coating should lie in the range between 100 nm and 2 mm.

The coating is particularly preferred to be temperature-stable at least up to 85° C. In this case, the coating is particularly suitable for the region of the displays and operating elements. It can even itself form an electrically conductive heating element.

A simple manufacture is then possible, if the coating is a sol-gel coating or an ITO coating. For example, with ITO coatings as temperature-dependent materials, locally resolving contact sensors in structured form or unstructured temperature sensors over a large surface area can be provided. It is also conceivable that a silicone coating is used as the coating.

A conceivable variant of the invention is that the back side of the coating that is not facing the underside of the cooktop is provided with a structuring, in particular a mechanical surface deformation or a thermally embossed deformation. The coating properties can be expanded by means of this modification of this coating. For example, the coating can be structured by mechanical deformation, for example with the use of embossing rollers. It is also conceivable that the coating is influenced thermally in a targeted manner, for example by use of lasers, or that the coating is etched. The coating can be formed, for example, as an electrically insulating layer or it may also be electrically conductive. With electrically conductive coatings, induction coils can be formed, for example, which then form the heating elements. The smooth underside of the cooktop makes possible a uniform coating thickness, so that the conductor path of the induction coil forms a uniform current-conducting cross section. Adjacent to the induction coil that has been introduced, an electrically insulating layer can be applied onto the underside of the cooktop.

Another variant of the invention is that the coating is an electrode of a contact-sensitive sensor (touch sensor), a pot or pan sensor or a pot-size sensor. Such electrodes can be shaped in structured form as electrodes for touch sensors, in particular in the field of the operating region to hide the touch electronics, in particular over the entire surface area of the cooktop in order to make possible, e.g., touch functionalities also in the direct vicinity of the cooking zones. The electrode design can be executed via at least two separate electrodes, so that it can distinguish between a finger contact and a larger pan bottom. In addition, it is conceivable that the electrodes are designed structured over their entire surface area as pot or pan sensors and pot-size sensors.

In addition, it is conceivable that the coating forms a thermal insulation. In this way heat transports for the purpose of saving energy can be eliminated in a targeted manner.

A particularly preferred variant of the invention is one such that the surface roughness of the underside of the cooktop is $R_a \leq 5$ μm, in the usual scanning region. With this surface roughness, on the one hand, contour-sharp displays can be produced, in particular if they are mounted at a distance. On the other hand, such a surface roughness forms a sufficiently strong binding for the coating.

A particularly preferred embodiment of the invention is characterized in that the cooktop 1 is surrounded by a frame 9 and that the frame holds the underside 3 in an edge region 10 of the cooktop 1 as shown in the sole figure. The smooth underside 3 of the cooktop 1 makes possible a particularly good seal between the cooktop 1 and the frame 9. A portion of the frame 9 has been removed in the figure for clarity. The portion of frame 9 that is shown is shown in cross-section.

BRIEF DESCRIPTION OF THE DRAWING

FIG. 1 is a schematic representation, in the lateral view, of a cooktop.

DETAILED DESCRIPTION OF THE INVENTION

The invention will be explained in further detail in the following on the basis of the example of embodiment that is shown in the drawing. In schematic representation and in the lateral view, this drawing shows a cooktop 1, which is composed of a glass-ceramic material. Cooktop 1 has an upper side 2 and an underside 3. Both upper side 2 as well as underside 3 are formed smooth approximately with the same surface structure. This means that, in particular, underside 3 does not have the usual periodically repeating knobby structures. Therefore, upper side 2 and underside 3 form two coplanar surfaces. A coating 4 and/or a foil 4 is introduced on underside 3. Here, for example, a screen printing method, a sputtering or an injection molding method can be used. Coating 4 is formed here by a transparent material. A light-emitting element 5, for example an LED, is coupled to cooktop 1 on back side 8. This light-emitting element 5 passes its light through coating 4 and through cooktop 1. The light then exits from upper side 2 of cooktop 1. For the formation of a display device, coating 4 can be marked, for example, with regions that are not light-transparent.

As the figure further shows, coating 4 can also be formed in an electrically conducting manner as an electrode, this electrode then being part of a contact-free sensor (touch sensor). Coating 4 can be contacted at an electronic control 7 by means of a contact 6, which can be formed, for example, from an electrically conductive foam. The electrically conductive coating 4 serving as an electrode can be disposed, for example, in the field of the operating region hiding the touch electronics (electronic control) 7. In particular, it is also possible that the coating extends over a large surface area, in particular over the entire surface area, over underside 3 of cooktop 1, in order to make possible, e.g., touch functionalities also in the direct vicinity of the cooking zone.

Within the scope of the invention, it is also conceivable to use IR touch sensors in the region of underside 3 of the cooktop. The IR sensors are disposed in the region of underside 3. Because of the smooth formation of underside 3 of the glass ceramics, a constant noise level can be provided. Consequently, this increases the sensitivity and decreases the interference or noise susceptibility of the IR sensors.

What is claimed is:

1. A glass-ceramic cooktop, comprising:
    a glass-ceramic material having an upper side and an underside,
    wherein the upper side is a flat upper side that forms a cooktop,
    wherein the underside is flat, unstructured, and coplanar with the upper side,
    wherein the underside is coated with at least one of a coating and a foil,
    wherein the coating, when present, is selected from the group consisting of a sol-gel, indium tin oxide, and a silicone, wherein the coating, when present, forms a mask with light-transparent regions and non-transparent regions therein, and the non-transparent regions are non-visible-light-transparent and non-infrared-light-transparent, wherein the glass-ceramic material has a thickness in a range between 2 mm and 6 mm, wherein the glass-ceramic material has a transmittance value of greater than 0.1% in the visible light range in the total wavelength region greater than 420 nm, a light transmittance in the visible range of 0.8-5%, and a transmittance of 45-85% in the infrared at 1600 nm, and wherein the glass-ceramic material comprises high quartz mixed crystals as a prevalent phase.

2. The glass-ceramic cooktop according to claim 1, wherein the coating is present, and the glass-ceramic cooktop further comprises a light-emitting element at a distance from the underside and in a region formed by the coating.

3. The glass-ceramic cooktop according to claim 1, wherein the coating is present and is electrically insulating.

4. The glass-ceramic cooktop according to claim 1, wherein the coating is present and is electrically conductive.

5. The glass-ceramic cooktop according to claim 1, wherein the coating is present and is an induction coil that is in direct contact with the underside.

6. The glass-ceramic cooktop according to claim 1, further comprising a sensor, wherein the coating is present and is an electrode of the sensor.

7. The glass-ceramic cooktop according to claim 6, wherein the sensor is selected from the group consisting of a contact-sensitive sensor, a pot or pan sensor, and a pot-size sensor.

8. The glass-ceramic cooktop according to claim 1, wherein the coating is present and is inductively activated.

9. The glass-ceramic cooktop according to claim 1, wherein the coating is present and is thermally insulating.

10. The glass-ceramic cooktop according to claim 1, wherein the underside has a surface roughness of less than or equal to 5 μm.

11. The glass-ceramic cooktop according to claim 1, wherein the coating, when present, is indium tin oxide.

12. The glass-ceramic cooktop according to claim 1, wherein the glass-ceramic material comprises at least one of $V_2O_5$, NiO, CoO, $Fe_2O_3$, and MnO.

13. A glass-ceramic cooktop, comprising:

a glass-ceramic material having an upper side and an underside, wherein the glass-ceramic material has a transmittance value of greater than 0.1% in the visible light range in the total wavelength region greater than 420 nm, a light transmittance in the visible range of 0.8-5%, and a transmittance of 45-85% in the infrared at 1600 nm, wherein the glass-ceramic material comprises high quartz mixed crystals as a prevalent crystal phase, wherein the upper side is a flat upper side that forms a cooktop, wherein the underside is flat, unstructured, and coplanar with the upper side, wherein the underside is coated with at least one of a coating and a foil, wherein the coating, when present, is selected from the group consisting of a sol-gel, indium tin oxide, and a silicone, and wherein the coating, when present, forms a mask with light-transparent regions and non-transparent regions therein, and the non-transparent regions are non-visible-light-transparent and non-infrared-light-transparent, wherein the cooktop further comprises a light element under the underside, wherein the light element emits light through the coating or the foil and the cooktop, and wherein the underside has a surface roughness Ra, such that Ra is 5 μm.

14. The glass-ceramic cooktop according to claim 13, wherein the coating, when present, comprises indium tin oxide.

15. The glass-ceramic cooktop according to claim 13, further comprising a frame that encloses the underside in an edge region of the cooktop.

16. The glass-ceramic cooktop according to claim 13, wherein the glass-ceramic material has an expansion coefficient of less than or equal to $2 \cdot 10^{-6} 1/K°$ in a temperature range of 20-700° C.

17. The glass-ceramic cooktop according to claim 13, wherein the coating, when present, is a material selected from the group consisting of metallic, metal-oxidic, inorganic, organic, and nitritic.

18. The glass-ceramic cooktop according to claim 13, wherein the glass-ceramic material comprises at least one of $V_2O_5$, NiO, CoO, $Fe_2O_3$, and MnO.

* * * * *